US008194863B2

(12) United States Patent
Takumai et al.

(10) Patent No.: US 8,194,863 B2
(45) **Date of Patent: *Jun. 5, 2012**

(54) SPEAKER SYSTEM

(75) Inventors: Susumu Takumai, Hamamatsu (JP); Yusuke Konagai, Hamamatsu (JP)

(73) Assignee: Yamaha Corporation (JP)

( * ) Notice: Subject to any disclaimer, the term of this patent is extended or adjusted under 35 U.S.C. 154(b) by 973 days.

This patent is subject to a terminal disclaimer.

(21) Appl. No.: 10/585,655

(22) PCT Filed: Jan. 4, 2005

(86) PCT No.: PCT/JP2005/000157

§ 371 (c)(1), (2), (4) Date: Jul. 7, 2006

(87) PCT Pub. No.: WO2005/067347

PCT Pub. Date: Jul. 21, 2005

(65) Prior Publication Data

US 2008/0159545 A1 Jul. 3, 2008

(30) Foreign Application Priority Data

Jan. 7, 2004 (JP) ................................ 2004-002511

(51) Int. Cl.

*H04R 5/00* (2006.01)
*H04R 1/40* (2006.01)
*H04R 5/02* (2006.01)
*H04B 3/00* (2006.01)

(52) U.S. Cl. .................. 381/27; 381/1; 381/17; 381/18; 381/19; 381/97; 381/80; 381/300; 381/307

(58) Field of Classification Search .................... 381/27, 381/1, 17, 92, 111, 122, 18, 335, 95–97, 381/19, 300, 307, 80

See application file for complete search history.

(56) References Cited

U.S. PATENT DOCUMENTS 3,772,479 A 11/1973 Hilbert (Continued)

FOREIGN PATENT DOCUMENTS

CA 2 107 320 C 3/1997

(Continued)

OTHER PUBLICATIONS

Relevant portion of International Search Report of corresponding PCT Application PCT/JP2005/000157.

(Continued)

*Primary Examiner* — Devona Faulk

(74) *Attorney, Agent, or Firm* — Rossi, Kimms & McDowell LLP

(57) ABSTRACT

A speaker array is provided which can increase the orientation when reproducing front channels of a surround sound, increase the density effect, improve the narrow directivity when reproducing a stereo sound and increase the selectivity in selecting reproduction methods which match setting environments. When reproducing a stereo sound by a speaker array for reproducing a surround sound by converting a sound into a beam of sound, the speaker array is divided into a sound reproducing region for an L system and a sound reproducing region for an R system at a central portion thereof. Then, each of the reproducing regions so divided is further divided in to bands. In addition, since a high frequency reproducing region has a high directivity and a strong orientation when the sound is attempted to be reproduced simultaneously by the plurality of speakers as is described above, a reproducing region is limited to part of the reproducing regions. Additionally, when stereo reproducing a front system of a surround sound source, the center orientation is improved by implementing different processings for the L, R systems and C. By adopting this configuration, it is possible to reproduce a sound with a natural stereo effect with no high frequency sound converted 25 into a beam of sound.

11 Claims, 8 Drawing Sheets

U.S. PATENT DOCUMENTS

| | | | |
|---|---|---|---|
| 4,024,344 | A | 5/1977 | Dolby et al. |
| 4,118,601 | A | 10/1978 | Yeap |
| 4,227,160 | A | 10/1980 | Tamori et al. |
| 4,472,834 | A | 9/1984 | Yamamuro et al. |
| 4,503,553 | A | 3/1985 | Davis |
| 4,984,273 | A | 1/1991 | Aylward et al. |
| 4,991,687 | A | 2/1991 | Oyaba et al. |
| 5,109,419 | A | 4/1992 | Griesinger |
| 5,233,664 | A | 8/1993 | Yanagawa et al. |
| 5,524,054 | A | 6/1996 | Spille |
| 5,631,714 | A | 5/1997 | Saadoun |
| 5,666,424 | A | 9/1997 | Fosgate et al. |
| 5,675,655 | A | 10/1997 | Hatae |
| 5,930,373 | A | 7/1999 | Shashoua et al. |
| 5,953,432 | A | 9/1999 | Yanagawa et al. |
| 6,005,948 | A | 12/1999 | Maeda |
| 6,128,395 | A | 10/2000 | De Vries |
| 6,181,796 | B1 | 1/2001 | Johnson |
| 6,240,189 | B1 | 5/2001 | Aylward |
| 6,285,891 | B1 | 9/2001 | Hoshino |
| 6,498,852 | B2 | 12/2002 | Grimani |
| 6,535,610 | B1 | 3/2003 | Stewart |
| 6,804,361 | B2 | 10/2004 | Hosoi et al. |
| 7,054,448 | B2 | 5/2006 | Yoshino et al. |
| 7,319,641 | B2 | 1/2008 | Goudie et al. |
| 7,515,719 | B2 | 4/2009 | Hooley et al. |
| 7,720,237 | B2 | 5/2010 | Bharitkar et al. |
| 7,822,496 | B2 | 10/2010 | Asada et al. |
| 7,826,626 | B2 | 11/2010 | Bharitkar et al. |
| RE42,390 | E | 5/2011 | Hosoi et al. |
| 2001/0016047 | A1 | 8/2001 | Ohta |
| 2002/0191807 | A1 | 12/2002 | Asada et al. |
| 2003/0185404 | A1 | 10/2003 | Milsap |
| 2004/0071299 | A1 | 4/2004 | Yoshino |
| 2004/0151325 | A1 | 8/2004 | Hooley et al. |
| 2004/0193050 | A1 | 9/2004 | Ogawa |
| 2004/0252844 | A1 | 12/2004 | Christensen et al. |
| 2005/0089182 | A1 | 4/2005 | Troughton et al. |
| 2005/0271230 | A1 | 12/2005 | Sasaki |
| 2006/0050897 | A1 | 3/2006 | Asada et al. |
| 2006/0153391 | A1 | 7/2006 | Hooley et al. |
| 2006/0204022 | A1 | 9/2006 | Hooley et al. |
| 2006/0233378 | A1 | 10/2006 | Kim et al. |
| 2007/0076905 | A1 | 4/2007 | Konagai et al. |
| 2007/0165878 | A1 | 7/2007 | Konagai |
| 2007/0217621 | A1 | 9/2007 | Takumai |
| 2008/0159545 | A1 | 7/2008 | Takumai |
| 2008/0226093 | A1 | 9/2008 | Kushida |
| 2009/0060237 | A1 | 3/2009 | Konagai |
| 2009/0296943 | A1 | 12/2009 | Martin |

FOREIGN PATENT DOCUMENTS

| | | | | |
|---|---|---|---|---|
| CN | 1200639 | A | | 12/1998 |
| CN | 1754403 | A | | 3/2006 |
| DE | 1 762 735 | A | | 10/1970 |
| DE | 27 29 051 | A1 | | 1/1979 |
| GB | 1 122 851 | A | | 8/1968 |
| GB | 2273848 | | | 6/1994 |
| GB | 2373956 | A | | 10/2002 |
| JP | 5-41897 | A | | 2/1993 |
| JP | 05-091589 | A | | 4/1993 |
| JP | 5-276591 | A | | 10/1993 |
| JP | 6-38289 | A | | 2/1994 |
| JP | 6-62488 | A | | 3/1994 |
| JP | 6-205496 | A | | 7/1994 |
| JP | 6-209500 | A | | 7/1994 |
| JP | 6-225379 | A | | 8/1994 |
| JP | 06225379 | A | * | 8/1994 |
| JP | 6-261385 | A | | 9/1994 |
| JP | 6-269096 | A | | 9/1994 |
| JP | 9-121400 | A | | 6/1997 |
| JP | 9-233591 | A | | 9/1997 |
| JP | 9-259539 | A | | 10/1997 |
| JP | 11-27604 | A | | 1/1999 |
| JP | 11-027604 | A | | 1/1999 |
| JP | 11-136788 | A | | 5/1999 |
| JP | 2001-025084 | A | | 5/1999 |
| JP | 11-69474 | A | | 9/1999 |
| JP | 2000-184488 | A | | 6/2000 |
| JP | 2001-128279 | A | | 5/2001 |
| JP | 2001-346297 | A | | 12/2001 |
| JP | 2002-340577 | A | | 11/2002 |
| JP | 2002-345077 | A | | 11/2002 |
| JP | 2003-23689 | A | | 1/2003 |
| JP | 2003-510924 | A | | 3/2003 |
| JP | 2003-230071 | A | | 8/2003 |
| JP | 2004-172661 | A | | 6/2004 |
| JP | 2004-172703 | A | | 6/2004 |
| JP | 2004-193698 | A | | 7/2004 |
| JP | 2004186895 | A | | 7/2004 |
| JP | 2004-531125 | A | | 10/2004 |
| JP | 2004-336530 | A | | 11/2004 |
| JP | 2004-349795 | A | | 12/2004 |
| JP | 2004-350173 | A | | 12/2004 |
| JP | 2004-363695 | A | | 12/2004 |
| JP | 2004-363697 | A | | 12/2004 |
| JP | 2005-12765 | A | | 1/2005 |
| JP | 2005-27020 | A | | 1/2005 |
| JP | 2006238155 | A | | 2/2005 |
| JP | 2005-80079 | A | | 3/2005 |
| JP | 2006319390 | A | | 5/2005 |
| JP | 2006-067301 | A | | 3/2006 |
| JP | 2006-518956 | A | | 8/2006 |
| JP | 2006-304128 | A | | 11/2006 |
| WO | 99/08479 | A1 | | 2/1999 |
| WO | WO 01/23104 | A2 | | 9/2000 |
| WO | 02078388 | A2 | | 3/2002 |
| WO | WO 02/078388 | A | | 10/2002 |
| WO | 03071827 | A2 | | 8/2003 |
| WO | 2004047490 | A1 | | 6/2004 |
| WO | 2004066673 | A1 | | 8/2004 |
| WO | 2004075601 | A1 | | 9/2004 |
| WO | 2005015956 | A1 | | 2/2005 |

OTHER PUBLICATIONS

Notification of Reason for Refusal issued in corresponding Japanese patent application No. 2004-002511, dated Jan. 22, 2008.

Notification of Reason for Refusal issued in corresponding Japanese patent application No. 2004-002511, dated Aug. 26, 2008.

Supplementary European Search Report issued in corresponding European Patent Application No. 05703396.1 dated Jun. 25, 2010.

Supplementary European Search Report cited in co-pending U.S. Appl. No. 10/585,269 which corresponds to EP 04808086.5.

International Search Report cited in co-pending U.S. Appl. No. 10/585,269 which corresponds to EP 05703397.9-2225, dated Aug. 6, 2007.

Meyer, David G.; "Digital Control of Loudspeaker Array Directivity"; Journal of the Audio Engineering Society; Oct. 1984; pp. 747-754; vol. 32-No. 12; New York, USA. Cited in co-pending U.S. Appl. No. 10/585,269.

Notification of Reason for Refusal cited in corresponding U.S. Appl. No. 10/585,269, which corresponds to JP 2004-000675, dated Sep. 25, 2007.

International Search Report cited in co-pending U.S. Appl. No. 10/585,269 which corresponds to PCT/JP2004/019736.

Notification of Reasons for Refusal cited in co-pending U.S. Appl. No. 10/585,269 which corresponds to JP 2004-000675, dated Feb. 19, 2008.

Decision of Refusal cited in co-pending U.S. Appl. No. 10/585,269 which corresponds to JP 2004-000675, dated May 20, 2008.

Notification of Reason of Refusal cited in co-pending U.S. Appl. No. 10/585,269 which corresponds to JP 2003-429819, dated Apr. 8, 2008.

International Search Report cited in co-pending U.S. Appl. No. 11/574,248 which corresponds to PCT/JP2005/015562, dated Dec. 13, 2005.

Notice of Reasons for Refusal cited in co-pending U.S. Appl. No. 11/574,248 which corresponds to JP 2004-246963, dated Jun. 6, 2006.

Chinese Office Action cited in corresponding co-pending U.S. Appl. No. 11/574,248 which corresponds to CN 2005800287301.

Supplemental European Search Report cited in co-pending U.S. Appl. No. 11/574,248 which corresponds to EP 05774560.6.
International Search Report cited in co-pending U.S. Appl. No. 11/817,074 which corresponds to PCT/JP2006/303319, dated May 16, 2006.
Notification of Reason of Refusal cited in co-pending U.S. Appl. No. 11/817,074 which corresponds to JP 2005-051099, dated Sep. 7, 2010.
Notification of First Office Action cited in co-pending U.S. Appl. No. 11/817,074 which corresponds to CN 2006800060275 dated May 8, 2009.
"Wideband Beamforming by Means of Multiple Band-Division Using Dolph-Chebyshev Spatial Filters"; Journal of Institute of Electronics, Information and Communication Engineers; Dec. 1995; pp. 1576-1584; vol. J78-A. Cited in co-pending U.S. Appl. No. 12/044,603.
Ohya et al; "Directional Array Speakers with the Specified Beam Direction by means of a Band-Division Design"; 10th Digital Signal Processing Symposium; Nov. 1-2, 1995; pp. 59-64. Cited in co-pending U.S. Appl. No. 12/044,603.
Extended European Search Report cited in co-pending U.S. Appl. No. 12/044,603 which corresponds to EP 08003945.6-2225, dated Jul. 7, 2008.
JP Office Action of Mar. 18, 2008 issued in corresponding JP 2004-002512 of related U.S. Appl. No. 10/585,654.
International Search Report issued for PCT/JP2005/000158; mailing date of Apr. 19, 2005.
International Search Report issued for PCT/JP2005/000159; mailing date of Apr. 19, 2005.
Supplementary EP Search Report issued in EP patent application No. 05703398.7-2225, which corresponds to related US patent No. 7,920,710; mailing date of Aug. 8, 2007.

* cited by examiner

SPEAKER SYSTEM

This application is a U.S. National Phase Application of PCT International Application PCT/JP2005/000157 filed on Jan. 4, 2005.

TECHNICAL FIELD

The present invention relates to a speaker system which includes an array of speakers for reproducing stereo sound with a natural stereo effect.

BACKGROUND ART

Conventionally, there has been proposed a technique in which the directivity of sound signal propagation is controlled by forming a sound beam using a plurality of speakers which are arranged in an array fashion (for example, refer to Patent Document No. 1). The utilization of this technique obviates the necessity of placing a plurality of speakers on the periphery of a user (a listener) as in the case with a conventional surround sound system and enables the reproduction of surround sound using a single panel made up of the array of speakers.

FIG. 4 is a top perspective view of a room in which the speaker system described in Patent Document No. 1 is set, which shows an example in which a 5.1-channel surround sound system is configured by a speaker system having an array of speakers. A speaker system 113 shown in FIG. 4 includes several tens to several hundreds of speaker units which are arranged into a predetermined array on a single panel, emits beams of surround sound by adjusting an output timing of surround sound from each speaker unit for every channel and implements a delay control so that the beams focus on wall surfaces. Then, the sound of each channel is made to be reflected on the ceiling or wall so as to be diffused to thereby produce a sound source on the wall, whereby a sound field of multiple channels is reproduced. As shown in FIG. 4, the speaker system 113, which is disposed at a lower portion of a video system 112 which is set in the vicinity of a central portion of a wall 120 of the room and in front of a user U, outputs directly to the user sounds similar to those produced by a center speaker (C) and a low frequency supplementing woofer (LFE). In addition, the speaker system 113 causes the beams to be reflected on walls 121, 122 which lie left and right to the user U so as to produce an R-channel speaker 114 and an L-channel speaker 115. Furthermore, the speaker system 113 causes the beams to be reflected on a ceiling 124, the walls 121, 122 which lie left and right to the user and a wall 123 which lie behind the user U so as to produce an SR-channel speaker 116 and an SL-channel speaker 117 which lie rear left and right of the user U. Thus, in the surround sound system of the array of speakers, the sound signal of each channel is delay controlled so as to be converted into the beam of sound, and the beams of sound so converted are then caused to be reflected on the walls so as to produce the plurality of sound sources, so that a surround-sound effect can be obtained which would be realized by setting a plurality of speakers on the periphery of the user U.

Here, in this description, in the 5.1-channel surround sound system, a front left channel is denoted by L (Left), a front right channel by R (Right), a center channel by C (Center), a rear left channel by SL (Surround Left), a rear right channel by SR (Surround Right), and a subwoofer by LFE (Low Frequency Effects).

Patent Document No. 1: JP-T-2003-510924 (the term "JP-T" as used herein means a published Japanese translation of PCT patent application)

FIGS. 5A, 5B are top perspective views which show an example in which the speaker system is set in a rectangular parallelepiped-like room which differs largely in dimension between width and depth. When listening to sound from the speaker system described in Patent Document No. 1, there occurs a case where sound is wanted to be reproduced in a stereo mode of only the front system channels (L, R (and C) or two channels including the surround channel. In addition, there also occurs a case where a stereo source is not converted into a beam but is wanted to be reproduced as a normal stereo sound.

For example, in the event that the speaker system of Patent Document No. 1 is set in the vicinity of an end portion of the rectangular parallelepiped-like room which differs largely in dimension between width and depth, as shown in FIG. 5A, since a distance from the speaker system to the wall lying left thereto is different from a distance from the speaker system to the wall lying right thereto, the spreading out effect of surround sound becomes excessive, and the density effect and orientation effect are deteriorated in sounds of, in particular, the front channels (L, R (and C)). Then, as this occurs, as shown in FIG. 5B, the sound of each channel is not converted into a sound beam but is converted into a stereo sound so as to preferably be reproduced as a normal stereo sound.

The speakers of the speaker system (the array of speakers) are allocated at a central portion of the system to a reproducing region for the L channel and a reproducing region for the R channel so as to reproduce sound from the speaker system as stereo sound using all the speakers, however, since a frontal directivity is generated in medium and high frequencies irrespective of outputting sound signals of the relevant channels simultaneously without implementing a delay control thereon, a sound image results which is far from the normal stereo effect. Due to this, there has existed a problem that the reproduction of stereo sound using all the speakers of the speaker system described in Patent Document No. 1 is not preferable.

DISCLOSURE OF THE INVENTION

Then, an object of the invention is to provide a speaker array for a speaker array system which can increase the orientation when reproducing front channels of a surround sound, increase the density effect, improve the narrow directivity when reproducing a stereo sound and increase the selectivity in selecting reproduction methods which match setting environments.

In order to solve the problem, the present invention has the following arrangement.

(1) A speaker system characterized by comprising:

a speaker array including a plurality of speakers which are arranged into a matrix; and sound signal processing means for dividing a sound source into a plurality of bands and dividing the speaker array into a plurality of reproduction regions so as to allocate the bands to the divided reproduction regions, respectively, the band of a high frequency being allocated to a smallest one of the reproduction regions.

(2) The speaker system according to (1), wherein the sound signal processing means sets regions which reproduce a left channel and a right channel of a stereo sound source or surround sound source such that a reproduction band increases from a central portion toward opposite end portions of the speaker array with the number of speakers allocated decreasing as the reproduction band increases.

(3) The speaker system according to (2), wherein the sound signal processing means implements a signal processing in such a manner that a sound signal of a center channel of the stereo sound source or surround sound source becomes non-directional.

(4) The speaker system according to (2), wherein the sound signal processing means sets a region which reproduces the center channel of the stereo sound source or surround sound source such that a reproduction band increases from the opposite end portions to the central portion with the number of speakers allocated decreasing as the reproduction band increases.

(5) A speaker system characterized by comprising:

a speaker array including a plurality of speakers which are arranged into a matrix; and unit speaker circuits provided to correspond to the speakers individually and each having a primary filter which filters sound signals of left and right channels of a stereo sound source or surround sound source, wherein a passable frequency band of the primary filter of each of the unit speaker circuits is set so as to increase from opposite end portions to a central portion of the speaker array.

(6) The speaker system according to (5), wherein the band of the primary filter is divided into a high frequency, a medium frequency and a low frequency and the number of the unit speaker circuits having the filter of the high frequency is made smaller than the number of those unit speaker circuits having filters of the other frequencies.

(7) The speaker system according to (5), wherein the band of the filter increases from the central portion to the opposite end portions of the speaker array.

(8) The speaker system according to (5), wherein the unit speaker circuit implements a signal processing in such a manner that a sound signal of a center channel of the stereo sound source or surround sound source becomes non-directional.

(9) The speaker system according to (5), wherein the unit speaker circuit has a secondary filter which filters a sound signal of the center channel of the stereo sound source or surround sound source and a passable frequency band of the secondary filter of each of the unit speaker circuits is set so as to increase from the opposite end portions to the central portion.

In the configuration that has been described above, when stereo reproducing a sound signal in the speaker array, the high frequency of the sound signal is made to be outputted by limiting speakers which reproduce the high frequency to those having a smallest reproduction region. Consequently, even when stereo reproducing a sound by the speaker array, the high frequency of the sound has such a directivity as to be converted into a beam of sound in no case, thereby making it possible to output the sound with a natural stereo effect which does not cause the listener to feel the sensation of physical disorder.

In the configuration, when reproducing sound signals of the left (left system) channel and the right (right system) channel of the stereo sound source or surround sound source by the speaker array, the high frequencies having strong directivity and orientation effect are allocated to the end portions of the speaker array, while the low frequency having weak directivity and orientation effect is allocated to the central portion. In addition, the number of speakers to be allocated to each of the frequency bands is made to decrease as the frequency increases. By adopting this configuration, the separating effect in orientation between the left channel and the right channel can be secured, whereby the high frequency is converted into a beam of sound in no case, thereby making it possible to obtain a natural stereo effect.

With the speaker array of the invention, since the area/position of the reproduction region for the high frequency is limited when reproducing a stereo sound, sound of high frequency has no directivity, thereby making it possible to reproduce a stereo sound with a natural sound effect.

In addition, with the speaker array of the invention, since the signal processing is implemented so that the sound of high frequency is made non-directional using the Bessel function when reproducing a stereo sound, a sound image with a normal stereo effect can be obtained without generating no frontal directivity.

BEST MODE FOR CARRYING OUT THE INVENTION

When reproducing a surround sound by a speaker array, there occurs a case where sound is wanted to be reproduced in a stereo mode of only front system channels (R and L (and furthermore, C is added)) or two channels including a surround channel. In addition, there occurs a case where only a stereo sound source (R and L signal components only) is wanted to be reproduced. In this invention, when reproducing a stereo sound by a speaker array for reproducing a surround sound by converting a sound into a beam of sound, the speaker array is divided into a sound reproducing region for an L system channel (L and/or SL) and a sound reproducing region for an R system channel (R and/or SR) from a central portion thereof. In addition, the reproducing regions so divided are each divided further into bands. Additionally, since the directivity increases and the orientation effect becomes strong in the high frequency reproducing region when sound is reproduced using a plurality of speakers simultaneously as has been described above, the reproducing regions are limited to part of the regions. In addition, the center orientation is improved by implementing different processings for the L, R channels and C channel when stereo reproducing the front system of a surround sound source. Thus, by adopting this configuration, the sound of high frequency is not converted into a beam of sound, so that a sound with a natural stereo effect can be reproduced.

Figure 1A:
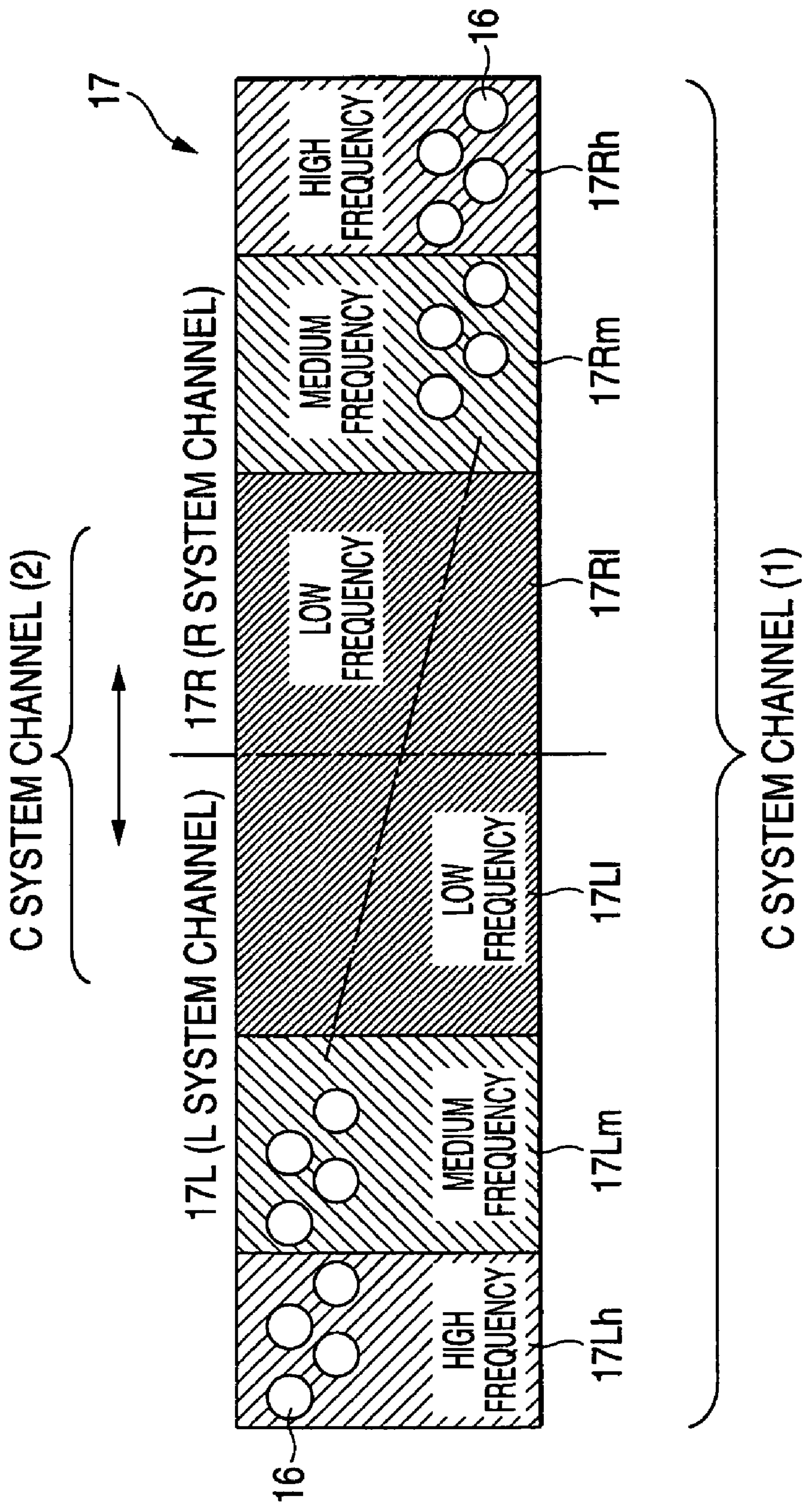
FIG. 1A shows an example of an arrangement of bands for reproducing a stereo sound by a speaker system including a speaker array.
Figure 1B:
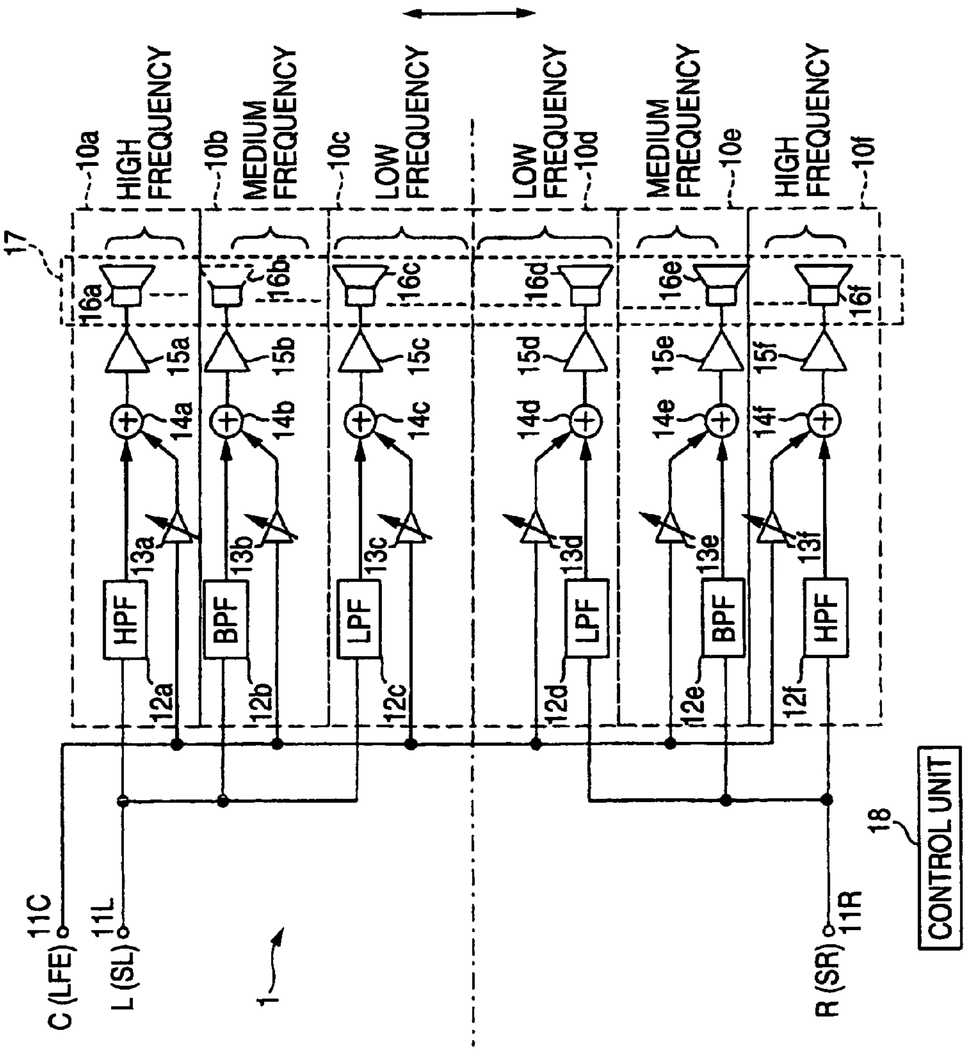
FIG. 1B is a circuit diagram showing the configuration of the speaker system.

Hereinafter, a specific embodiment will be described. FIG. 1A shows an example of an arrangement of bands for reproducing a stereo sound by a speaker system including a speaker array, and FIG. 1B is a circuit diagram which shows the configuration of the speaker system. In FIG. 1A, although part thereof is not shown therein, a speaker system 1 is made up into a laterally elongated speaker array which is made up of a plurality of speakers 16 which are arranged into a matrix.

Note that while in the following description, a case will be described as an example in which a sound to be reproduced is divided into three bands: a low frequency; a medium frequency; and a high frequency, more bands can be set by dividing the sound further. In addition, while the speaker system according to the embodiment of the invention can output not only a stereo sound but also sound signals of channels of a surround sound source by converting them into beams of sound, the description and illustration of a configuration therefor will be omitted herein.

When reproducing a stereo sound by the speaker array, for example, reproducing regions for the relevant bands are allocated as shown in FIG. 1A. Namely, the speaker array 17 is divided into a sound reproducing region 17L for an L system channel and a sound reproducing region 17R for an R system channel at a central portion thereof. In addition, the sound to be reproduced is divided into three bands: a high frequency; a medium frequency; and a low frequency. Then, In each of the sound reproducing regions 17L, 17R, portions of the reproducing region is allocated to the high frequency, medium frequency and low frequency in that order from an outer side (an end portion side) towards a central side of the speaker array 17. Namely, the sound reproducing region 17L for the L system channel is divided into a high frequency 17Lh, a medium frequency 17Lm and a low frequency 17Ll. In addition, the sound reproducing region 17R for the R system channel is divided into a high frequency 17Rh, a medium frequency 17Rm and a low frequency 17Rl.

Here, in order to align the directivities of the bands with each other, the number of speakers to be allocated to each band is set to decrease as the frequency increases. Namely, the numbers of speakers for the bands are set as high frequency<medium frequency<low frequency. As this occurs, the number of speakers for the high frequency is preferably adjusted through an experiment so that a sound of high frequency to be reproduced has no directivity, whereby since the separating effect in orientation between the L system channel and the R system channel is secured and a sound of high frequency is not converted into a beam of sound, it is possible to obtain a natural stereo effect.

In addition, when reproducing a surround sound in a stereo fashion by the speaker array, as shown in FIG. 1A, for the L system (L•SL) channel and the R system (R•SR) channel, similar to the case described above where the stereo sound is reproduced, the numbers of speakers for the reproducing regions may be set as high frequency<medium frequency<low frequency, and portions of the speaker array may be allocated to the high frequency, medium frequency and low frequency in that order from the outer side (the end portion side) of the speaker array towards the central side thereof. In addition, for a sound of the C channel, a sound may be set to be reproduced (1) over the whole of the speaker array or (2) at a predetermined region of the central portion of the speaker array, and a non-directional sound may be set to be reproduced by preventing the conversion of, in particular, a high frequency sound into a beam of sound using the Bessel function. Thus, when stereo reproducing the front channels of the surround sound source, the center orientation can be improved by implementing different processings for the L and R system channels and the C channel in the way described above.

Note that hereinafter, a speaker array will be referred to as a Bessel array which outputs a sound which is signal processed so as to be non-directional by preventing the conversion of, in particular, a high frequency sound into a beam of sound.

Next, a circuit configuration will be described in which a speaker array is made to reproduce a sound by setting the reproducing regions for the bands as shown in FIG. 1A. As shown in FIG. 1B, the speaker system 1 includes a plurality of unit speaker circuits 10*a* to 10*f* which are each made up of a plurality of unit speaker circuits. In addition, the speaker system 1 includes a terminal 11C into which a sound signal of the C channel is inputted, a terminal 11L into which a sound signal of the L system (L•SL) channel is inputted and a terminal 11R into which a sound signal of the R system (R•SR) channel is inputted. In the speaker system 1, respective sound signals inputted from the terminals are processed at each of the unit speaker circuits 10*a* to 10*f* and are outputted from each of speakers 16*a* to 16*f* which make up the speaker array 17. The control of each unit of the speaker system 1 is implemented by a control unit 18.

Each unit speaker circuit is made up in such a manner that the numbers of unit speaker circuits are set as follows:

$$10a=10f<10b=10e<10c=10d$$

The unit speaker circuit 10*a* for reproducing the high frequency in the L system channel is made up of a high-pass filter 12*a*, a variable amplifier 13*a*, an adder 14*a*, a power amplifier 15*a* and a speaker 16*a*. The unit speaker circuit 10*b* for reproducing the medium frequency of the L system channel is made up of a band-pass filter 12*b* for medium frequency, a variable amplifier 13*b*, an adder 14*b*, a power amplifier 15*b* and a speaker 16*b*. The unit speaker circuit 10*c* for reproducing the low frequency of the L system channel is made up of a low-pass filter 12*c*, a variable amplifier 13*c*, an adder 14*c*, a power amplifier 15*c* and a speaker 16*c*.

The unit speaker circuit 10*d* for reproducing the low frequency of the R system channel is made up of a low-pass filter 12*d*, a variable amplifier 13*d*, an adder 14*d*, a power amplifier 15*d* and a speaker 16*d*. The unit speaker circuit 10*e* for reproducing the medium frequency of the R system channel is made up of a band-pass filter 12*e* for medium frequency, a variable amplifier 13*e*, an adder 14*e*, a power amplifier 15*e* and a speaker 16*e*. The unit speaker circuit 10*f* for reproducing the high frequency of the R system channel is made up of a high-pass filter 12*f*, a variable amplifier 13*f*, an adder 14*f*, a power amplifier 15*f* and a speaker 16*f*.

Here, the variable amplifiers 13*a* to 13*f* are adjusted based on control signals outputted from the control unit 18. The control unit 18 outputs control signals based on the result of an operation made using the Bessel function so that non-directional sounds are outputted from the speakers 16*a* to 16*f* by preventing the conversion of high frequency sounds into beams of sound.

A sound signal of the C channel inputted from the terminal 11C is sent to the variable amplifiers 13*a* to 13*f*. In addition, a sound signal of the L system channel inputted from the terminal 11L is sent to the high-pass filter 12*a*, the band-pass filter 12*b* and the low-pass filter 12*c*. Furthermore, a sound signal of the R system channel inputted from the terminal 11R is sent to the low-pass filter 12*d*, the band-pass filter 12*e* and the high-pass filter 12*f*.

In the unit speaker circuit 10*a*, a high frequency component of the sound signal of the L system channel outputted from the high-pass filter 12*a* and the sound signal of the C channel that has been signal processed based on the Bessel function in the variable amplifier 13*a* are added together by the adder 14*a*, amplified by the power amplifier 15*a* and outputted from the speaker 16*a*.

In the unit speaker circuit 10*b*, a medium frequency component of the sound signal of the L system channel outputted from the band-pass filter 12*b* and the sound signal of the C channel that has been signal processed based on the Bessel function in the variable amplifier 13*b* are added together by the adder 14*b*, amplified by the power amplifier 15*b* and outputted from the speaker 16*b*.

In the unit speaker circuit 10*c*, a low frequency component of the sound signal of the L system channel outputted from the low-pass filter 12*c* and the sound signal that has been signal processed based on the Bessel function in the variable amplifier 13*c* are added together by the adder 14*c*, amplified by the power amplifier 15*c* and outputted from the speaker 16*c*.

In the unit speaker circuit 10*d*, a low frequency component of the sound signal of the R system channel outputted from the low-pass filter 12*d* and the sound signal that has been signal processed based on the Bessel function in the variable amplifier 13*d* are added together by the adder 14*d*, amplified by the power amplifier 15*d* and outputted from the speaker 16*d*.

In the unit speaker circuit 10*e*, a medium frequency component of the sound signal of the R system channel outputted from the band-pass filter 12*e* and the sound signal that has been signal processed based on the Bessel function in the variable amplifier 13*e* are added together by the adder 14*e*, amplified by the power amplifier 15*e* and outputted from the speaker 16*e*.

In the unit speaker circuit 10*f*, a high frequency component of the sound signal of the R system channel outputted from the high-pass filter 12*f* and the sound signal of the C channel that has been signal processed based on the Bessel function in the variable amplifier 13*f* are added together by the amplifier 14*f* and are outputted from the speaker 16*f*.

By reproducing a stereo sound and a surround sound in a stereo fashion by the speaker array 1 that is configured like this, the separating effect in the orientation of the L system channel and the R system channel is secured, and furthermore, a natural stereo effect can be obtained with no high frequency sound converted into a beam of sound.

Figure 2A:
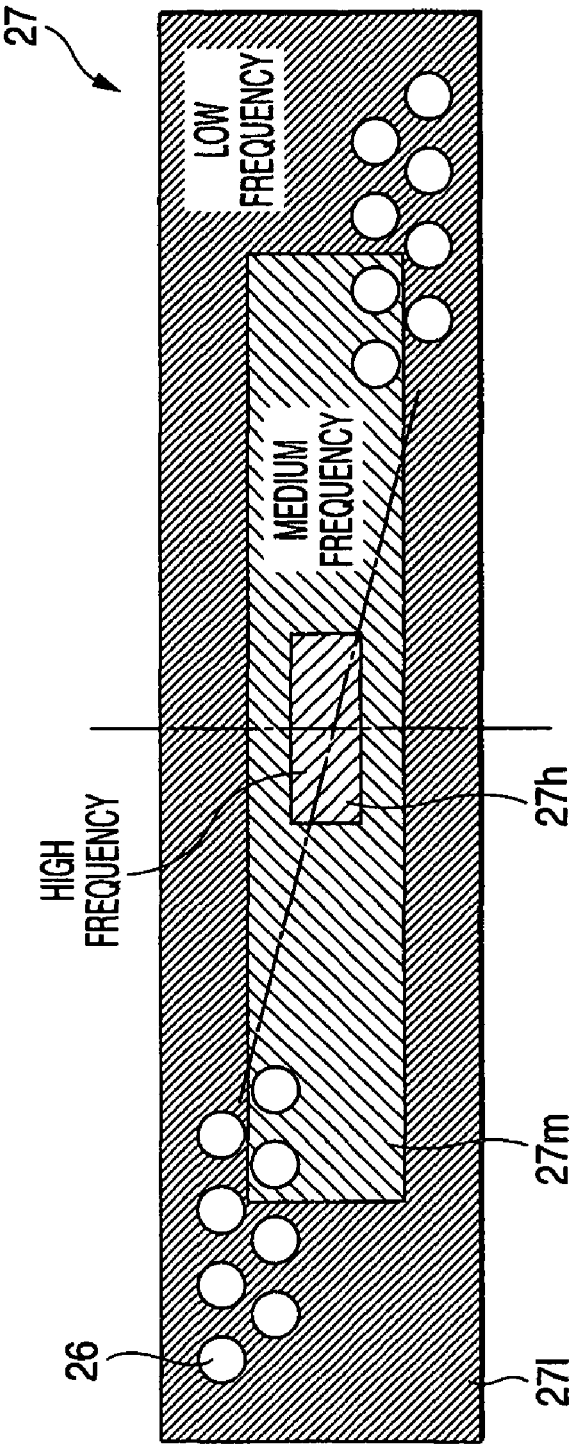
FIGS. 2A, 2B and 2C show arrangements of sound reproducing regions which are set in a speaker array.

Next, in the event that the Bessel array as shown in FIG. 1A is not applied to the sound of the C channel in the speaker system, the reproducing regions may be set as high frequency<medium frequency<low frequency. FIG. 2 shows drawings illustrating arrangements of sound reproducing regions which are set in a speaker array. For example, as shown in FIG. 2A, in a speaker system 2, a central portion of the speaker array 27 is allocated to a reproducing region 27*h* for high frequency, a portion surrounding the high frequency reproducing region is allocated to a reproducing region 27*m* for medium frequency, and furthermore, a portion surrounding the medium frequency reproducing region is allocated to a reproducing region 27*l* for low frequency. As this occurs, in order to align directivities of the bands so allocated with each other, the numbers of speakers to be allocated to the individual reproducing regions are set to decrease as the frequency increases. By adopting this configuration, the sound of the C channel also can be oriented centrally with no sound of high frequency converted into a beam of sound.

Figure 2B:
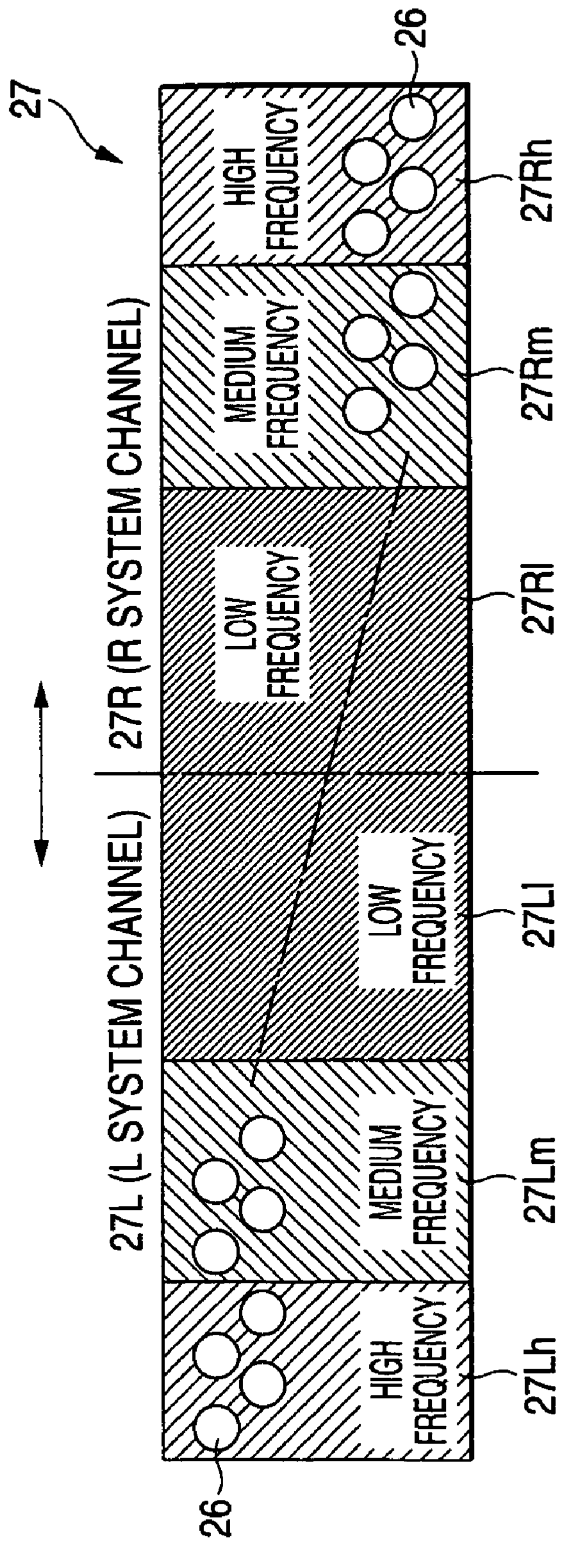

As this occurs, other surround sounds that are to be reproduced as a stereo sound, that is, as to the L system (L•SL) channel and the R system (R•SR) channel, similar to the region arrangement shown in FIG. 1A, portions of each of the reproducing regions may be allocated to a high frequency, a medium frequency and a low frequency in that order from an outer side (an end portion side) towards a central side of the speaker array (refer to FIG. 2B.).

Figure 2C:
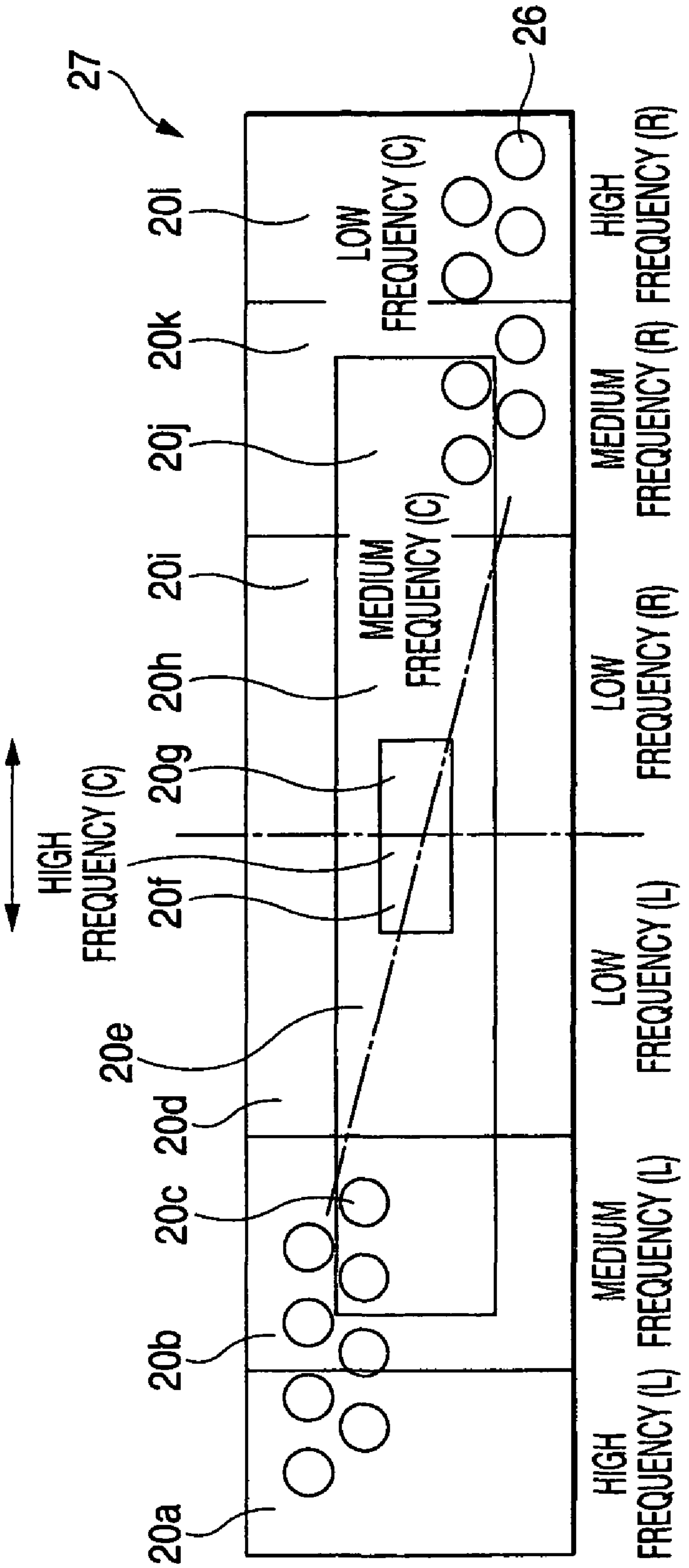
Figure 3:
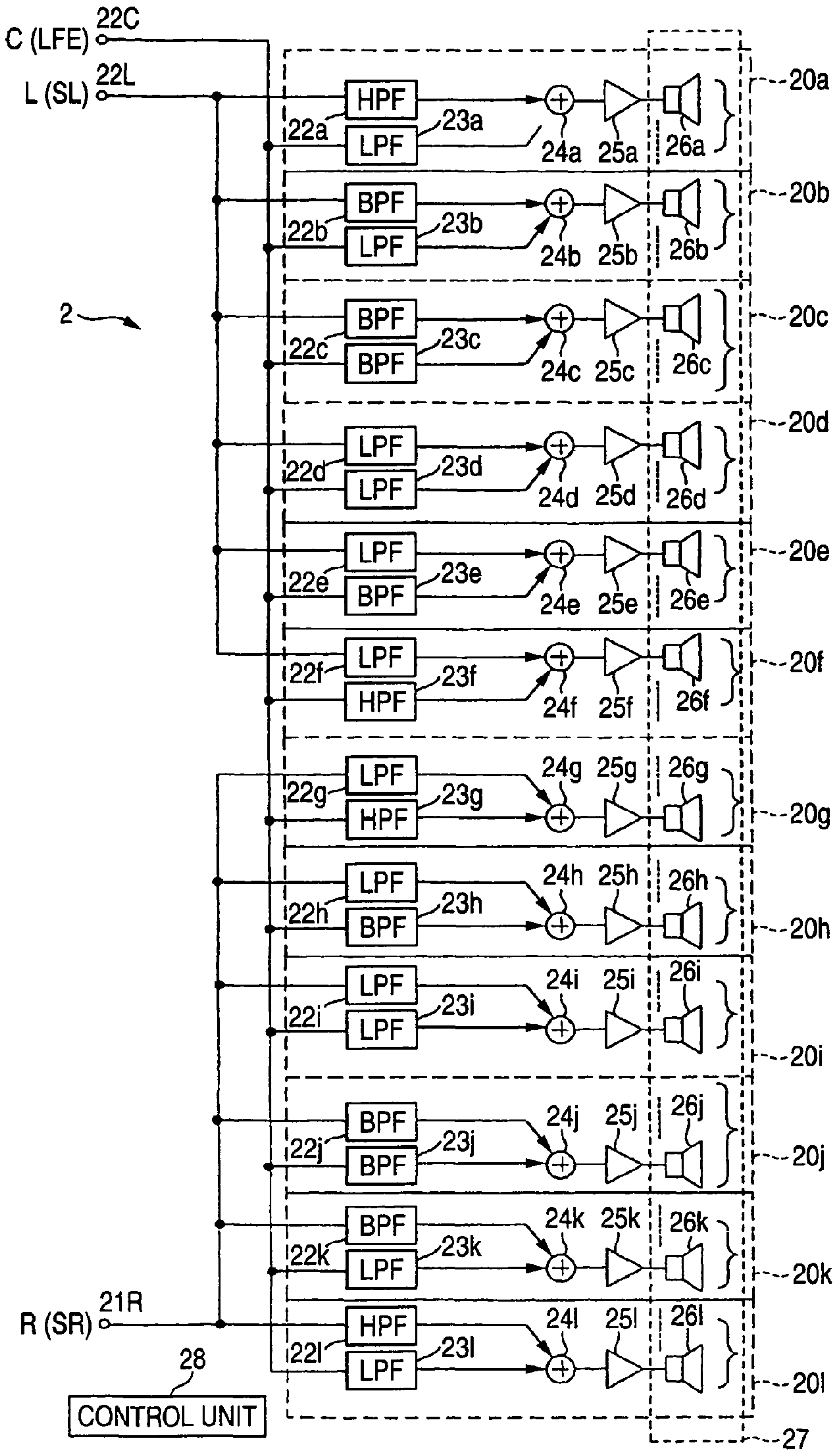
FIG. 3 is a circuit diagram showing the configuration of a speaker system which is different from that shown in FIG. 1.

Here, with the speaker system 2, in the speaker array 27, a sound signal of the C channel is reproduced in the reproducing regions divided as shown in FIG. 2A, and sound signals of the L system channel and the R system channel are reproduced in the reproducing regions divided as shown in FIG. 2B. Due to this, as shown in FIG. 2C, the low frequency reproducing regions of the L and R system channels coincide with the reproducing regions for high frequency, medium frequency and low frequency of the C channel. In addition, the medium frequency reproducing regions of the L and R system channels coincide with the reproducing regions for medium frequency and low frequency of the C channel. Furthermore, the high frequency reproducing regions of the L and R system channels coincide with the low frequency reproducing region of the C channel. Consequently, the circuit configuration of the speaker system 2 results in a configuration shown in FIG. 3. FIG. 3 is a circuit diagram showing the configuration of a speaker system which is different from that shown in FIG. 1.

As shown in FIG. 3, the speaker system 2 includes a plurality of unit speaker circuits 20*a* to 20*f* which are each made up of a plurality of unit speaker circuits. In addition, the speaker system 2 includes a terminal 21C into which a sound signal of the C channel is inputted, a terminal 21L into which a sound signal of the L system (L•SL) channel is inputted and a terminal 21R into which a sound signal of the R system (R•SR) channel is inputted. In the speaker system 2, sound signals inputted from these terminals are processed in each of the unit speaker circuits 20*a* to 20*l* and outputted from each of speakers 26*a* to 26*l* which make up the speaker array 27.

Here, when paying attention to the unit speaker circuits for reproducing the sound signal of the C channel, the unit speaker circuits are made up in such a manner that the numbers of unit speaker circuits result as follows:

$$(20f+20g)<(20c+20e+20h+20j)<(20a+20b+20d+20i+20k+20l)$$

In addition, when paying attention to the unit speaker circuits for reproducing the sound signals of the L system channel and the R system channel, the unit speaker circuits are made up in such a manner that the numbers of unit speaker circuits result as follows:

$$20a=20l<(20b+20c)=(20j+20k)<(20d+20e+20f)=(20g+20h+20i)$$

The unit speaker circuit 20*a* for reproducing a high frequency of the L system channel and a low frequency of the C channel is made up or a high-pass filter 22*a*, a low-pass filter 23*a*, an adder 24*a*, a power amplifier 25*a* and a speaker 26*a*.

The unit speaker circuit 20*b* for reproducing a medium frequency of the L system channel and the low frequency of the C channel is made up of a band-pass filter 22*b* for medium frequency, a low-pass filter 23*b*, an adder 24*b*, a power amplifier 25*b* and a speaker 26*b*. The unit speaker circuit 20*c* for reproducing the medium frequency of the L system channel and a medium frequency of the C channel is made up of a band-pass filter 22*c* for medium frequency, a band-pass filter 23*c* for medium frequency, an adder 24*c*, a power amplifier 25*c* and a speaker 26*c*.

The unit speaker circuit 20*d* for reproducing a low frequency of the L system channel and a low frequency of the C channel is made up of a low-pass filter 22*d*, a low-pass filter 23*d*, an adder 24*d*, a power amplifier 25*d* and a speaker 26*d*. The unit speaker circuit 20*e* for reproducing the low frequency of the L system channel and the medium frequency of the C channel is made up of a low-pass filter 22*e*, a band-pass filter 23*e* for medium frequency, an adder 24*e*, a power amplifier 25*e* and a speaker 26*e*. The unit speaker circuit 20*f* for reproducing the low frequency of the L system channel and a high frequency of the C channel is made up of a low-pass filter 22*f*, a high-pass filter 23*f*, an adder 24*f*, a power amplifier 25*f* and a speaker 26*f*.

The unit speaker circuit 20*g* for reproducing a low frequency of the R system channel and the high frequency of the C channel is made up of a low-pass filter 22*g*, a high-pass filter 23*g*, an adder 24*g* and a speaker 26*g*. The unit speaker circuit 20*h* for reproducing a medium frequency of the R system channel and the medium frequency of the C channel is made up of a low-pass filter 22*h*, a band-pass filter 23*h* for medium frequency, an adder 24*h*, a power amplifier 25*h* and a speaker 26*h*. The unit speaker circuit 20*i* for reproducing the low frequency of the R system channel and the low frequency of the C channel is made up of a low-pass filter 22*i*, a low-pass filter 23*i*, an adder 24*i*, a power amplifier 25*i* and a speaker 26*i*.

The unit speaker circuit 20*j* for reproducing a medium frequency of the R system channel and the medium frequency of the C channel is made up of a band-pass filter 22*j* for medium frequency, a band-pass filter 23*j* for medium frequency, an adder 24*j*, a power amplifier 25*j* and a speaker 26*j*. The unit speaker circuit 20*k* for reproducing the medium frequency of the R system channel and the low frequency of the C channel is made up of a band-pass filter for medium frequency 22*k*, a low-pass filter 23*k*, an adder 24*k*, a power amplifier 25*k* and a speaker 26*k*.

The unit speaker circuit 20*l* for reproducing a high frequency of the R system channel and the low frequency of the C channel is made up of a high-pass filter 22*l*, a low-pass filter 23*l*, an adder 24*l*, a power amplifier 25*l* and a speaker 26*l*.

Here, in the speaker array 2, since 20*a* and 20*l*, 20*b* and 20*k*, 20*c* and 20*j*, 20*d* and 20*i*, 20*e* and 20*h*, and 20*f* and 20*g* of the unit speaker circuits are identical in configuration to each other, in the following description, a reference numeral of one of the identical unit speaker circuits is followed by a reference numeral of the other unit speaker circuit which is put in parentheses.

A sound signal of the C channel inputted from the terminal 22C is sent to each of the filers 23*a* to 23*l*. In addition, a sound signal of the L system channel inputted from the terminal 22L is sent to each of the filters 22*a* to 22*f*. Furthermore, a sound signal of the R system channel inputted from the terminal 21R is sent to each of the filters 22*g* to 22*l*.

In the unit speaker circuit 20*a*(20*l*), a high frequency component of the sound signal f the L(R) system channel outputted from the high-pass filter 22*a* (22*l*) and a low frequency component of the sound signal of the C channel outputted from the low-pass filter 23*a*(23*l*) are added together by the adder 24*a*(24*l*), amplified by the power amplifier 25*a*(25*l*) and outputted from the speaker 26*a* (26*l*).

In the unit speaker circuit 20*b* (20*k*), a medium frequency component of the sound signal of the L(R) system channel outputted from the band-pass filter 22*b* (22*k*) and a low frequency component of the sound signal of the C channel outputted from the low-pass filter 23*b*(23*k*) are added together by the adder 24*b*(24*k*), amplified by the power amplifier 25*b*(25*k*) and are outputted from the speaker 26*b* (26*k*).

In the unit speaker circuit 20*c* (20*j*), a medium frequency component of the L(R) system channel outputted from the band-pass filter 22*c*(22*j*) and a medium frequency component of the sound signal outputted from the band-pass filter 23*c* (23*j*) are added together by the adder 24*d* (24*j*), amplified by the power amplifier 25*c*(25*j*) and outputted from the speaker 26*c*(26*j*).

In the unit speaker circuit 20*d*(20*i*), a low frequency component of the sound signal outputted from the L(R) system channel outputted from the low-pass filter 22*d*(22*i*) and a low frequency component of the sound signal of the C channel outputted from the low-pass filter 23*d*(23*i*) are added together by the adder 24*d*(24*i*), amplified by the power amplifier 25*d* (25*i*) and outputted from the speaker 26*d*(26*i*).

In the unit speaker circuit 20*e*(20*h*), a low frequency component of the sound signal of the L(R) system channel outputted from the low-pass filter 22*e*(22*h*) and a medium frequency component of the sound signal of the C channel outputted from the band-pass filter 23*e* (23*h*) are added together by the adder 24*e*(24*h*), amplified by the power amplifier 25*e*(25*h*) and outputted from the speaker 26*e*(26*h*).

In the unit speaker circuit 20*f*(20*g*), a low frequency component of the sound signal of the L(R) system channel outputted from the low-pass filter 22*f* (22*g*) and a high frequency component of the sound signal of the C channel outputted from the high-pass filter 23*f*(23*g*) are added together by the adder 24*f*(24*g*), amplified by the power amplifier 25*f*(26*f*) and outputted from the speaker 26*f*(26*g*).

By reproducing a stereo sound and a surround sound in a stereo fashion by the speaker array 2 that is configured as has been described above, the separating effect in orientation between the L system channel and the R system channel is secured and the sound of the C channel is oriented centrally, and furthermore, a natural stereo effect can be obtained with no high frequency sound converted into a beam of sound.

Note that a control unit 28 confirms the kind of a sound source to be reproduced, reads out data on the arrangement of reproducing regions according to the source so confirmed from a storage unit, not shown, or a memory of the control unit.

Figure 4:
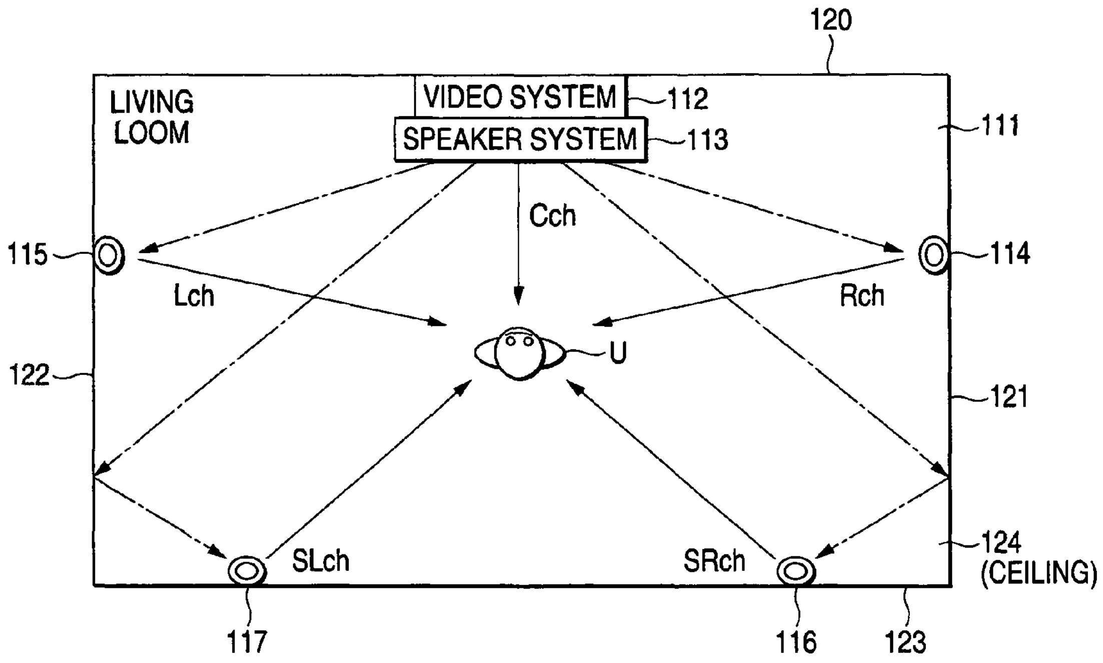
FIG. 4 is a top perspective view of a room in which a conventional speaker system is set.
Figure 5A:
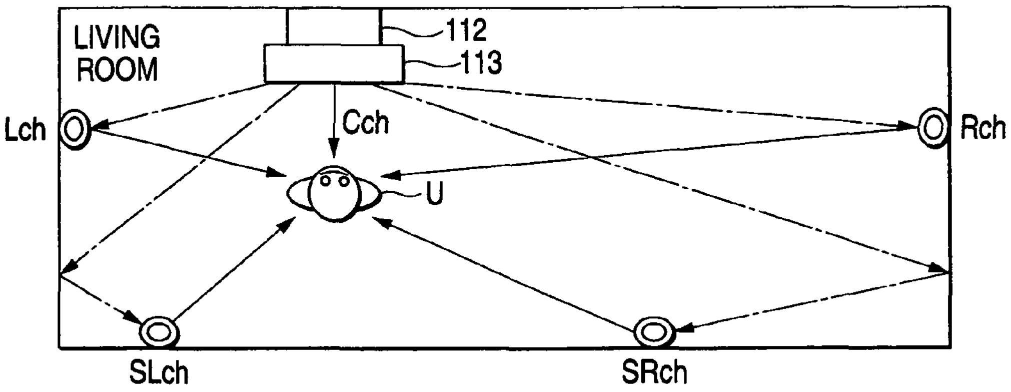
FIGS. 5A, 5B are top perspective views showing an example in which the conventional speaker system is set in a rectangular parallelepiped room which differs largely in dimension between width and depth.
Figure 5B:
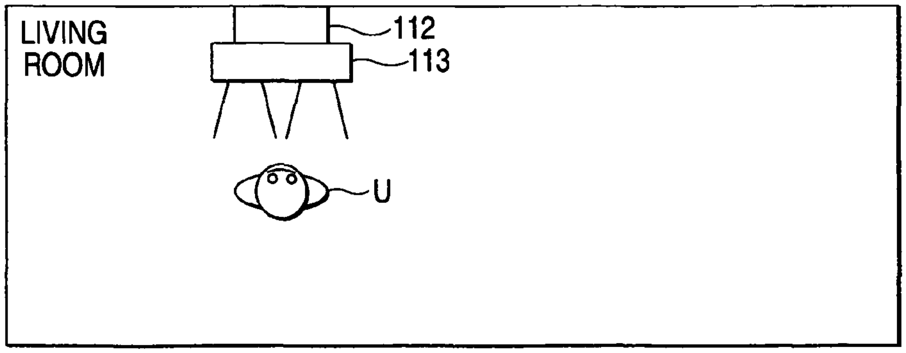

With the speaker system according to the embodiment, the arrangements of reproducing region can automatically be selected according to the sound sources to be reproduced. For example, in the case of the speaker system 1, when a sound source to be reproduced is a stereo sound, the unit speaker circuits are set so as to realize the arrangement of reproducing regions shown in FIG. 1A, while a sound source to be reproduced is a 5.1-channel surround sound, a sound signal of each channel except for an LFE channel can be set so as to be converted into a beam of sound for output, as shown in FIG. 4. In addition, when the user operates a control unit, not shown, the reproducing regions are switched over as shown in FIGS. 2A, 2B, 2C so that the 5.1-channel surround sound can be reproduced in a stereo fashion.

Note that while in the description that has been made heretofore, each channel of the surround sound is described as being reproduced in the stereo fashion, sounds of the SL channel and the SR channel, which constitute a rear channel, may be made not to be reproduced in the stereo fashion but to be reproduced by being converted into beams of sound. By adopting this configuration, when attempting to reproduce a surround system by setting the speaker system in a room constructed as shown in FIG. 4, it is possible to reproduce a sound with a surround effect.

In the embodiment that has been described heretofore, while the sound source is divided into three bands (high frequency, medium frequency, low frequency), the invention is not limited thereto, and hence, the sound source may be divided into four bands, and in addition, the frequency band which can pass through the filters for the L and R system channels of the unit speaker circuits may be set so as to gradually increase from the central portion towards both the end portions of the speaker array.

The invention claimed is:

1. A speaker system comprising:

a speaker array including a plurality of speakers arranged into a matrix; and a sound signal processing unit that divides a sound source into at least three frequency bands and divides the speaker array into at least three reproduction regions corresponding to the number of the frequency bands to allocate the frequency bands to the divided reproduction regions, respectively, wherein the number of speakers allocated to each of the at least three reproduction regions is different, and wherein the frequency band with a highest passing frequency is allocated to the reproduction region with a smallest number of speakers.

2. A speaker system comprising:

a speaker array including a plurality of speakers arranged into a matrix; and a sound signal processing unit that divides a sound source into a plurality of frequency bands and divides the speaker array into a corresponding number of reproduction regions to allocate the frequency bands to the divided reproduction regions, respectively, wherein the number of speakers allocated to each of the reproduction regions is different, wherein the frequency band with a highest passing frequency is allocated to the reproduction region with a smallest number of speakers, wherein the plurality of frequency bands includes at least a low passing frequency band and a high passing frequency band, wherein the sound signal processing unit sets the speaker array into left and right reproduction regions for reproducing a left channel and a right channel of a stereo sound source or surround sound source, wherein the left and right reproduction regions for the low passing frequency band are located at a central portion of the speaker array, wherein the left and right reproduction regions for the high passing frequency band are located at opposite end portions of the speaker array, and wherein the number of speakers allocated to the left and right reproduction regions decreases as the passing frequency of the frequency bands increases.

3. The speaker system according to claim 2, wherein the sound signal processing unit processes a sound signal of a center channel of the stereo sound source or surround sound source so as to become non-directional.

4. The speaker system according to claim 2, wherein:

the sound signal processing unit sets left and right center channel reproduction regions that reproduce a center channel of the stereo sound source or surround sound source, the left and right center channel reproduction regions for the high passing frequency band are located at a central region of the speaker array, the left and right center channel reproduction regions for the low passing frequency band are positioned farthest away from the left and right center channel reproduction regions for the high frequency band, and the number of speakers allocated to the left and right center channel reproduction regions decreases as the passing frequency of the frequency bands increases.

5. A speaker system comprising:

a speaker array including a plurality of speakers arranged into a matrix; and a plurality of speaker driving circuits each for driving one of the speakers, wherein each of the speaker driving circuits has a primary filter that filters sound signals of left and right channels of a stereo sound source or surround sound source, and wherein a passing frequency band permitted to pass in each of the primary filter is set to decrease from the speakers positioned at opposite end portions of the speaker array to the speaker or speakers positioned at a central portion of the speaker array, and wherein each of the speaker driving circuits has a secondary filter that filters a sound signal of the center channel of the stereo sound source or surround sound source and the passing frequency band of the secondary filter of each of the speaker driving circuits is set to increase from the speakers positioned at a peripheral region of the speaker array to the speaker or speakers positioned at a central region of the speaker array.

6. The speaker system according to claim 5, wherein the passing frequency band of the primary filter is divided into a high frequency band, a medium frequency band, and a low frequency band, and the number of the speaker driving circuits set to pass the high frequency band is smaller than the number of the speaker driving circuits set to pass the low or medium frequency band.

7. The speaker system according to claim 5, wherein the speaker driving circuits process a sound signal of a center channel of the stereo sound source or surround sound source so as to become non-directional.

8. A speaker system comprising:

a speaker array including a plurality of speakers arranged into a matrix; and a sound signal processing unit that divides a sound source into a plurality of frequency bands and divides the speaker array into a corresponding number of reproduction regions to allocate the frequency bands to the divided reproduction regions, respectively, wherein the number of speakers allocated to each of the reproduction regions is different, wherein the frequency band with a highest passing frequency is allocated to the reproduction region with a smallest number of speakers, wherein the plurality of frequency bands includes at least a low passing frequency band and a high passing frequency band, wherein the sound signal processing unit sets the speaker array into left and right reproduction regions for reproducing a left channel and a right channel of a stereo sound source or surround sound source, and wherein the left and right channel reproduction regions for the high passing frequency band are located at opposite end portions of the speaker array and have a smaller number of speakers than the left and right channel reproduction regions for the high passing frequency band.

9. A speaker system comprising:

a speaker array including a plurality of speakers arranged into a matrix; and a sound signal processing unit that divides a sound source into a plurality of frequency bands and divides the speaker array into a corresponding number of reproduction regions to allocate the frequency bands to the divided reproduction regions, respectively, wherein the number of speakers allocated to each of the reproduction regions is different, wherein the frequency band with a highest passing frequency is allocated to the reproduction region with a smallest number of speakers, wherein the plurality of frequency bands includes at least a low passing frequency band and a high passing frequency band, wherein the sound signal processing unit sets left and right center channel reproduction regions that reproduce a center channel of the stereo sound source or surround sound source, and wherein the left and right center channel reproduction regions for the high passing frequency band are located at a central region of the speaker array and have a smaller number of speakers than the left and right center channel reproduction regions for the high passing frequency band.

10. A speaker system comprising:

a speaker array including a plurality of speakers arranged into a matrix; and a sound signal processing unit that divides a sound source into a plurality of frequency bands and divides the speaker array into a corresponding number of reproduction regions to allocate the frequency bands to the divided reproduction regions, respectively, wherein the number of speakers allocated to each of the reproduction regions is different, wherein the frequency band with a highest passing frequency is allocated to the reproduction region with a smallest number of speakers, wherein the plurality of frequency bands includes at least a low passing frequency band and a high passing frequency band, wherein the sound signal processing unit sets the speaker array into left and right reproduction regions for reproducing a left channel and a right channel of a stereo sound source or surround sound source, wherein the sound signal processing unit sets left and right center channel reproduction regions that reproduce a center channel of the stereo sound source or surround sound source, wherein the left and right channel reproduction regions for the high passing frequency band are located at opposite end portions of the speaker array and have a smaller number of speakers than the left and right channel reproduction regions for the high passing frequency band, and wherein the left and right center channel reproduction regions for the high passing frequency band are located at a central region of the speaker array and have a smaller number of speakers than the left and right center channel reproduction regions for the high passing frequency band.

11. A speaker system comprising:

a speaker array including a plurality of speakers arranged into a matrix; and a sound signal processing unit that divides a sound source into a plurality of frequency bands and divides the speaker array into a corresponding number of reproduction regions to allocate the frequency bands to the divided reproduction regions, respectively, wherein the number of speakers allocated to each of the reproduction regions is different, wherein the frequency band with a highest passing frequency is allocated to the reproduction region with a smallest number of speakers, wherein the plurality of frequency bands includes at least a low passing frequency band and a high passing frequency band, wherein the sound signal processing unit sets the speaker array into left and right reproduction regions for reproducing a left channel, a right channel, and a center channel of a stereo sound source or surround sound source, wherein the left and right channel reproduction regions for the high passing frequency band are located at opposite end portions of the speaker array and have a smaller number of speakers than the left and right channel reproduction regions for the high passing frequency band, and wherein the center channel reproduction region for the high passing frequency band are located at a central region of the speaker array and has a smaller number of speakers than the center channel reproduction region for the high passing frequency band.

* * * * *